United States Patent

Platz et al.

[15] 3,650,292

[45] Mar. 21, 1972

[54] DEVICE FOR DEFLECTING LIQUID OR GASEOUS MEDIA IN RECTANGULAR DUCTS

[72] Inventors: Stephan Platz; Peter Herzhoff, both of Leverkusen; Hans Gref, Cologne, all of Germany

[73] Assignee: Agfa-Gevaert Aktiengesellschaft, Leverkusen, Germany

[22] Filed: June 22, 1970

[21] Appl. No.: 48,038

[30] Foreign Application Priority Data

July 12, 1969 Germany ..................... P 19 35 487.1

[52] U.S. Cl. ............................................. 137/561, 138/39
[51] Int. Cl. ................................................... F15d 1/04
[58] Field of Search ................... 137/561, 262, 549; 138/39

[56] References Cited

UNITED STATES PATENTS

| 2,364,058 | 12/1944 | Burk et al. | 137/561 |
| 3,420,443 | 1/1969 | Van Koppen et al. | 137/561 X |
| 3,423,913 | 1/1969 | Mecklin | 137/561 |
| 3,482,597 | 12/1969 | Smith, Jr. | 137/561 X |

*Primary Examiner*—William R. Cline
*Attorney*—Connolly and Hutz

[57] ABSTRACT

Fluid is uniformly distributed from spaced apertures along a distributing duct supplied by a perpendicular feed duct by inserting a perforated angular extension of the feed duct within and across the distributing duct with its central pointed edge in contact with the apertured wall of the distributing duct. A series of uniformly spaced short vanes are mounted parallel to the distributing duct on the outside of the angular extension, which is conveniently made of screen material and attached within the connected ducts by flanges.

3 Claims, 6 Drawing Figures

PATENTED MAR 21 1972                             3,650,292

INVENTORS:
STEPHAN PLATZ, PETER HERZHOFF, HANS GREF.
BY Connolly and Hutz
their attorneys.

DEVICE FOR DEFLECTING LIQUID OR GASEOUS MEDIA IN RECTANGULAR DUCTS

This invention relates to a device for guiding and deflecting liquid or gaseous media from a rectangular feed duct into a similarly rectangular or trapezoidal distributor duct which is fitted with retaining screens, extends perpendicularly of the feed duct and has outlet openings uniformly distributed over the length of that duct wall opposite the inflow opening.

In order to prevent those outlet openings in the distributor duct opposite the feed duct from being directly acted upon, it is common practice to provide a retaining board whose plane extends perpendicularly of the inflow direction. This expedient, however, only makes is possible to obtain a deflection, rather than a uniform distribution, of the flow over the cross section of the distributor duct. Other known deflecting systems comprise retaining baffle screens arranged parallel with the axis of the inflow duct, cooperating with a displacement body. Unfortunately, displacement bodies of this type cover those blow jets or nozzles which are opposite the inlet opening, so that these nozzles are unable to function, which reduces the efficiency, for example the drying effect, of the distributor duct. It is also known that shaped baffles can be used to deflect flow. Such baffles, however must be very carefully adapted to local conditions if a satisfactory flow pattern is to be obtained.

It has now been found that these disadvantages can be obviated if, in accordance with the present invention, the retaining screens are arranged in the distributor duct laterally of the opening of the feed or inflow duct and form walls of a duct insert which tapers conically in the inflow direction and whose tip is in contact with that duct wall having the outlet or blowout openings, baffle plates or vanes extending axially parallel with the distributor duct being provided close to the outlet surfaces of the screen walls.

In this way, the flow is uniformly deflected, and the outflow rate is uniformly distributed over the cross section of the distributor duct without in any way interfering with a given blow-nozzle section of the distributor duct. The arrangement is in no way affected by nonuniform initial flow from the inflow opening, or by the distributor duct having a cross section that differs from the rectangular.

Embodiments of the subject of the invention are diagrammatically illustrated by way of example in the accompanying drawings in which.

Figure 1:
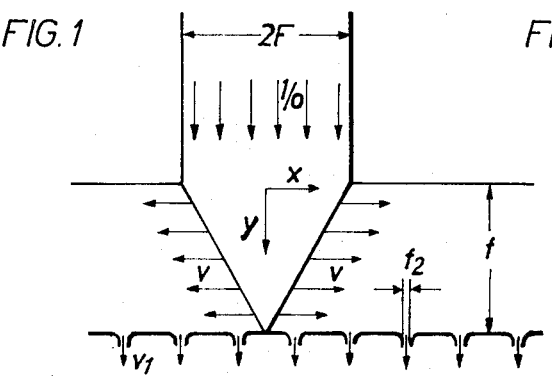
FIG. 1 is a diagrammatic view in cross-sectional elevation of the manner in which air flows through one embodiment of this invention.
Figure 2:
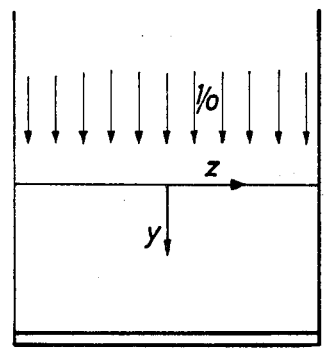
FIG. 2 is an end when in cross-sectional elevation similar to FIG. 1.

FIGS. 1 and 2 are diagrammatic longitudinal and cross sections through a distributor duct and a feed duct, of a type occurring frequently in dry-air supply systems, where air is supplied downwards from a feed duct into a distributor duct, the air flow being deflected through 90° on one or, as shown, two sides at the inlet of the distributor duct. $v_o$ represents the initial flow rate in the feed cross section 2F, $v$ represents the flow rate after deflection in the cross section $f$ of the duct, and $f_2$ represents the outlet cross section of each blow nozzle. $x$, $y$ and $z$ represent co-ordinate axes mutually at right angles, $x$ being parallel to the axis of the distributor duct, $y$ being parallel to the axis of the feed duct, and $z$ being perpendicular to both axes. In addition to the known conditions that the cross-sectional ratio $\Sigma f_2 : f_1$ or the ratio of areas of outlet opening to remaining wall, should be less than 1, every effort must be made to ensure that the velocity $v$ is also uniformly distributed over the cross section $f$. $v_1$ represents the rate of flow in the blow nozzles.

Figure 3:
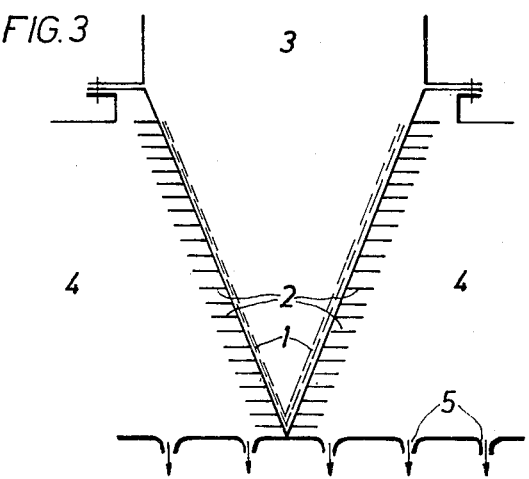
FIG. 3 is a cross-sectional front view in elevation of one embodiment of this invention installed in the space between connected feed and distributor ducts.
Figure 4:
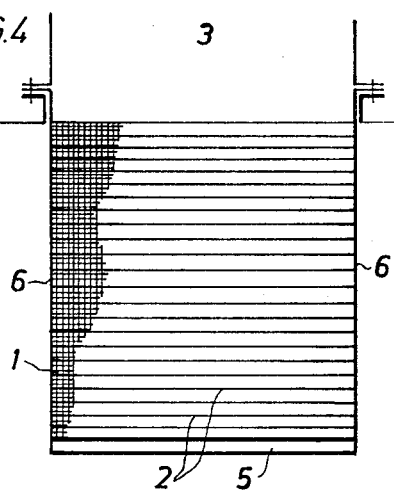
FIG. 4 is a cross-sectional end view in elevation of the embodiment shown in FIG. 3.

FIGS. 3 and 4, a cross section and a side elevation, respectively, show by way of example a screen insert according to the invention installed in a rectangular distributor duct 4 with blow nozzles 5. In this embodiment, the screen insert is in the form of a closed component which comprises retaining screens 1, baffles 2 and two lateral boundary walls 6, and which is fastened by means of a flange 7 to the distributor duct 4 and the feed duct 3. A component of this kind makes it possible to manufacture the insert independently of the much more bulky distributor duct 4 and to remove it without difficulty during stoppages in production for cleaning purposes. This is of particular importance when cleanliness has to meet very exacting demands (for example, in the production of photographic films).

The pressure loss occurring in this arrangement, amounting to approximately twice the dynamic pressure, based on the initial flow velocity $v_o$ (FIG. 1), can be accepted in installations of this kind.

Figure 5:
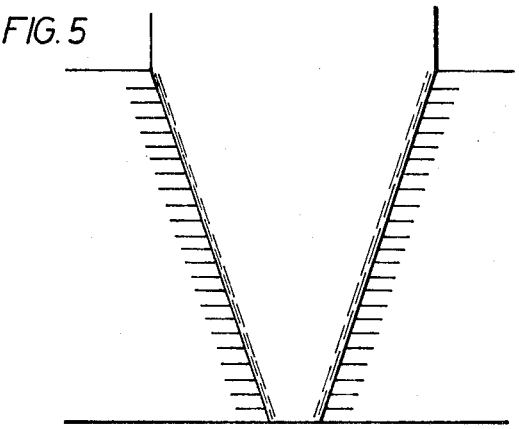
FIG. 5 is a cross-sectional front view in elevation of a deviation from an embodiment of this invention.
Figure 6:
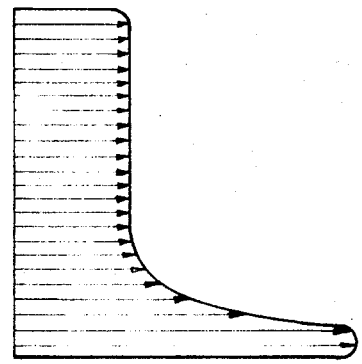
FIG. 6 is a flow velocity diagram corresponding to the deviation shown in FIG. 5.

It is important that the triangular screen arrangement should be strictly maintained. Even in the event of only minor changes in the triangular form, which could be brought about for example, as shown in FIG. 5, by widening the tip of the cone or wedge, the pronounced deviation from the uniform velocity distribution indicated qualitatively in FIG. 6 is obtained.

It has been found that the required uniform distribution of velocity over the cross section $f$ is also obtained in the distributor duct 4 when this duct has the frequently occurring trapezoidal cross section, instead of the rectangular cross section shown in FIG. 4. Even when an elbow is incorporated just before the screen insert in the feed duct of a rectangular or trapezoidal blow box, an adequately uniform distribution of velocity is obtained after the insert. Even with blow boxes whose $xy$-plane has a pronounced curve, the subsequent incorporation of triangular screen inserts has resulted in a highly satisfactory standardizing of the outlet or outflow velocity $v_1$ in the blow nozzles.

The Figures show the two-sided deflection of an air stream through 90° on each side. In the case of one-sided deflection, a partition has to be provided in the plane of symmetry $x=0$, and only half the Figure studied.

As mentioned above, the arrangement according to the invention may be used both for liquid and for gaseous media, and is particularly suitable for use as an air inlet component for blowing ducts in drying installations.

We claim:

1. A device for uniformly distributing fluid through a series of substantially uniformly spaced openings in the outlet wall of a distributing duct opposite a feed duct connected substantially perpendicularly to it, said ducts having pairs of walls substantially perpendicular to and aligned with each other comprising a perforated angular extension of said pair of perpendicular walls of said feed duct inserted within and extending across said pair of aligned walls of said distributing duct and having a central pointed edge in contact with said outlet wall of said distributing duct, and a series of substantially uniformly spaced short vanes being disposed substantially parallel to the length of the distributing duct and mounted on the outside of said perforated angular extension.

2. A device as set forth in claim 1 wherein said feed and distributing ducts are connected by flanges, said angular extension also having flanges, and all of said flanges being connected together to secure said extension within said distribution duct.

3. A device as set forth in claim 1 wherein said perforated angular extension comprises screen walls.

* * * * *